(12) United States Patent
Gage et al.

(10) Patent No.: US 9,099,139 B2
(45) Date of Patent: Aug. 4, 2015

(54) WAVEGUIDE WITH PHASE SHIFTING PORTIONS

(71) Applicant: Seagate Technology LLC, Cupertino, CA (US)

(72) Inventors: Edward Charles Gage, Lakeville, MN (US); Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/789,158

(22) Filed: Mar. 7, 2013

(65) Prior Publication Data

US 2014/0254335 A1    Sep. 11, 2014

(51) Int. Cl.
*G11B 11/00* (2006.01)
*G11B 5/60* (2006.01)
*G11B 5/31* (2006.01)
*G11B 5/48* (2006.01)
*G11B 13/08* (2006.01)
*G11B 5/00* (2006.01)

(52) U.S. Cl.
CPC .............. *G11B 5/6088* (2013.01); *G11B 5/314* (2013.01); *G11B 5/4866* (2013.01); *G11B 13/08* (2013.01); *G11B 2005/0021* (2013.01)

(58) Field of Classification Search
CPC ........... G11B 5/314; G11B 2005/0021; G11B 2005/001; G11B 7/1387; G11B 11/10554; G11B 7/1384; G11B 7/1206
USPC ........ 369/13.33, 13.13, 112.27, 13.32, 13.24, 369/13.14, 13.03, 13.02, 13.12, 13.22
See application file for complete search history.

(56) References Cited

U.S. PATENT DOCUMENTS

| | | | |
|---|---|---|---|
| 5,479,551 A | 12/1995 | DiGiovanni et al. | |
| 8,085,473 B2 | 12/2011 | Itagi et al. | |
| 8,456,969 B1 * | 6/2013 | Mooney et al. | 369/13.33 |
| 8,619,512 B1 * | 12/2013 | Yuan et al. | 369/13.33 |
| 8,755,256 B2 * | 6/2014 | Maletzky et al. | 369/13.33 |
| 2008/0170319 A1 * | 7/2008 | Seigler et al. | 360/59 |
| 2010/0271910 A1 | 10/2010 | Boutaghou | |

* cited by examiner

*Primary Examiner* — Ali Neyzari
(74) *Attorney, Agent, or Firm* — Hollingsworth Davis, LLC

(57) ABSTRACT

An apparatus includes a plasmonic transducer with first and second oppositely disposed outer edges. A waveguide is configured to receive light from a light source, the waveguide have first and second portions that deliver first and second portions of the light to the first and second edges of the plasmonic transducer. The first and second portions are different by at least one of a geometry and a construction to cause a relative phase shift between the first and second portions of the light.

20 Claims, 10 Drawing Sheets

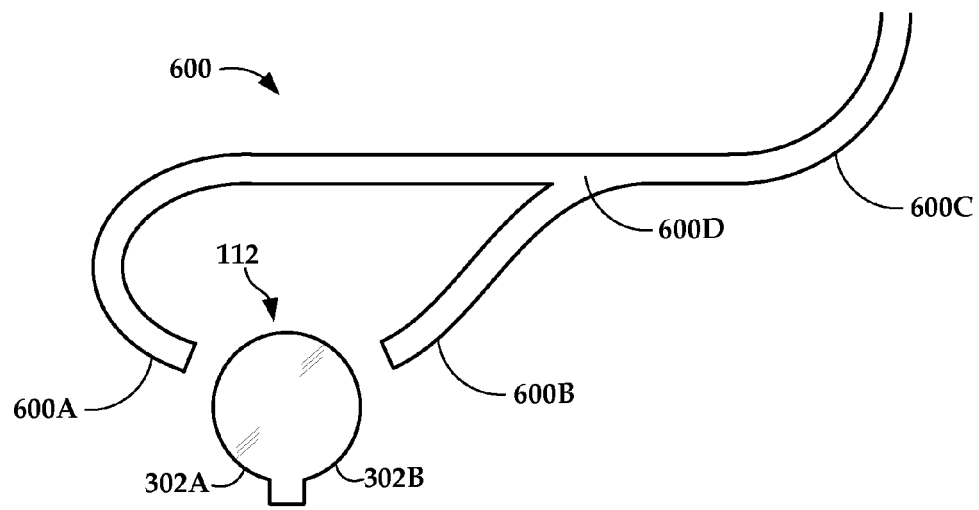
FIG. 6
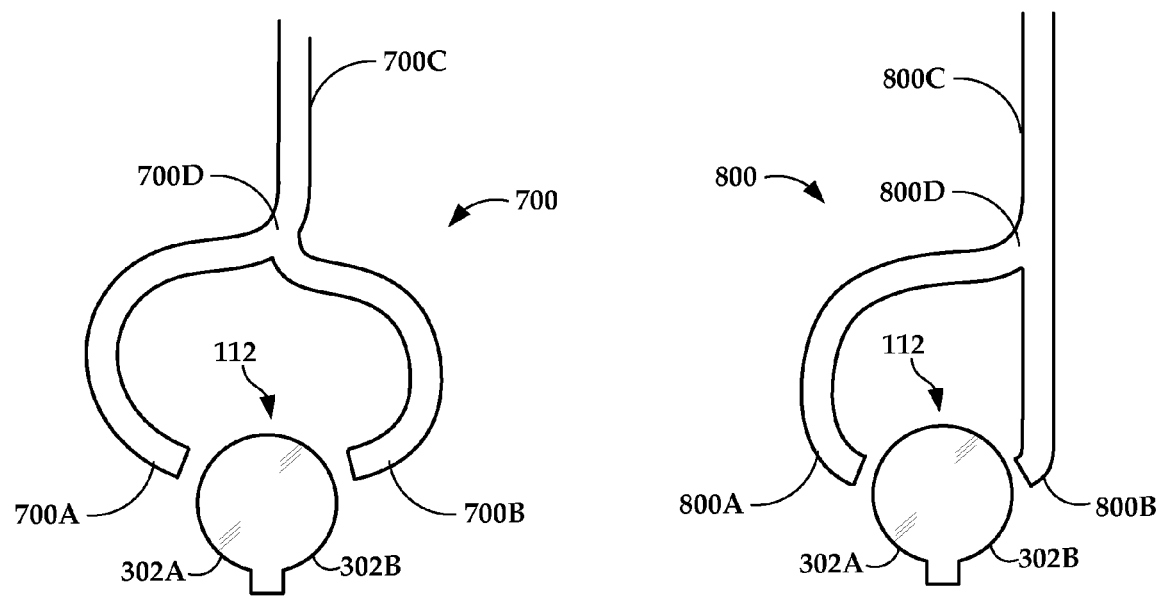
FIG. 7
FIG. 8

WAVEGUIDE WITH PHASE SHIFTING PORTIONS

SUMMARY

Various embodiments described herein are generally directed to an apparatus having a plasmonic transducer with first and second oppositely disposed outer edges. A waveguide is configured to receive light from a light source, the waveguide have first and second portions that deliver first and second portions of the light to the first and second edges of the plasmonic transducer. The first and second portions are different by at least one of a geometry and a construction to cause a relative phase shift between the first and second portions of the light.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 6-8 are a schematic diagrams illustrating split waveguides according to example embodiment;

DETAILED DESCRIPTION

Figure 1:
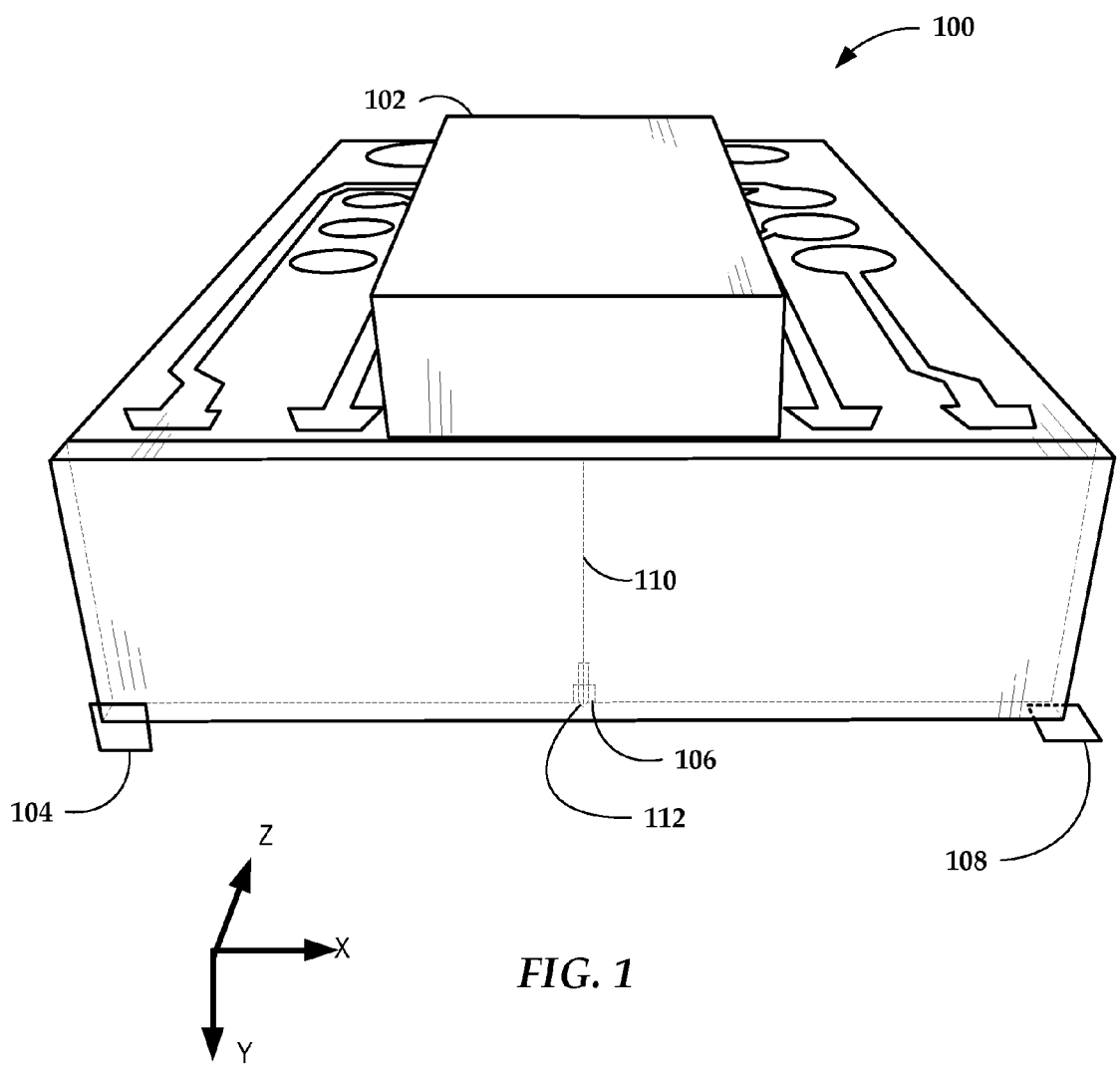
FIG. 1 is a perspective view of a slider according to an example embodiment.

The present disclosure relates to waveguide structures that deliver energy (e.g., light) to a near-field transducer (NFT). An NFT and waveguide described herein may be usable in any application where a beam of highly focused and relatively powerful electromagnetic energy is desired. One such application is in heat assisted magnetic recording (HAMR), also referred to as thermally assisted magnetic recording (TAMR). In reference to FIG. 1, a perspective view shows an example HAMR slider 100. This example slider 100 includes a laser diode 102 located on top of the slider 100 proximate to a trailing edge surface 104 of the slider 100. The laser diode 102 delivers light proximate to a HAMR read/write head 106, which has one edge on an air bearing surface 108 of the slider 100. The air bearing surface 108 faces and is held proximate to a moving media surface (not shown) during device operation.

The laser diode 102 provides electromagnetic energy to heat the media at a point near to the read/write head 106. Optical coupling components, such as a waveguide 110, are formed integrally within the slider device 100 to deliver light from the laser 102 to the media. In particular, a local waveguide 110 and NFT 112 may be located proximate the read/write head 106 to provide local heating of the media during write operations. The laser diode 102 in this example may be an integral, edge firing device, although it will be appreciated that the waveguide 110 and NFT 112 may be used with any light source and light delivery mechanisms. For example, a surface emitting laser (SEL) may be used instead of an edge firing laser.

While the example in FIG. 1 shows a laser 102 integrated with the slider 100, the NFT 112 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to a slider-integrated waveguide 110 which energizes the NFT 112.

A HAMR device utilizes the types of optical devices described above to heat a magnetic recording media (e.g., hard disk) in order to overcome superparamagnetic effects that limit the areal data density of typical magnetic media. When writing to a HAMR medium, the light is concentrated into a small hotspot over the track where writing takes place. The light propagates through a waveguide 110 where it is coupled to the NFT 112, e.g., either directly from the waveguide or by way of a focusing element. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via rectangular dielectric slab or channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device designed to reach local surface plasmon resonance at a designed wavelength. A waveguide and/or other optical element concentrates light on a transducer region (e.g., focal region) where the NFT 112 is located. The NFT 112 is designed to achieve surface plasmon resonance in response to this concentration of light. At resonance, a high electric field surrounds the NFT 112 due to the collective oscillations of electrons at the metal surface. Part of this field will tunnel into a storage medium and get absorbed, thereby raising the temperature of a spot on the media as it being recorded.

Figure 2:
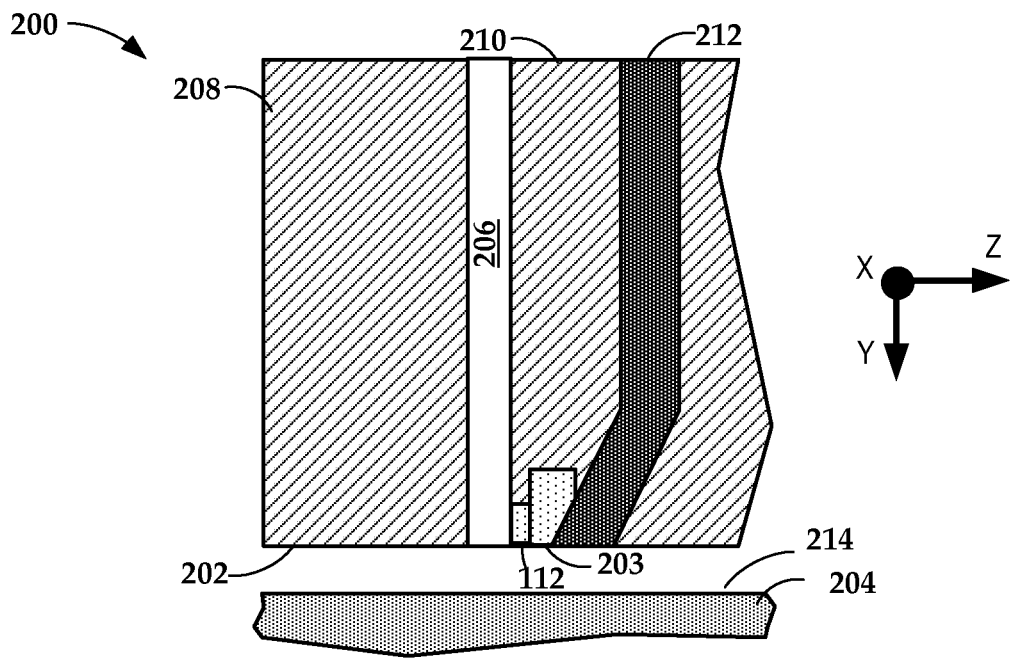
FIG. 2 is a cross-sectional view of a heat assisted magnetic recording apparatus according to an example embodiment.

In reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2A, the media-facing surface 202 is arranged parallel to the x-z plane. A waveguide core 206 may be disposed proximate the NFT 112, which is located at or near the media writing surface 214.

The waveguide core 206 is surrounded by cladding layers 208, 210 that have different indices of refraction than the core 206. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2A is a recording pole 212 of the read/write head that is located alongside the NFT 112. The recording pole 212 generates a magnetic field (e.g., perpendicular field) used in changing the magnetic orientation of the hotspot during writing.

Figure 3:
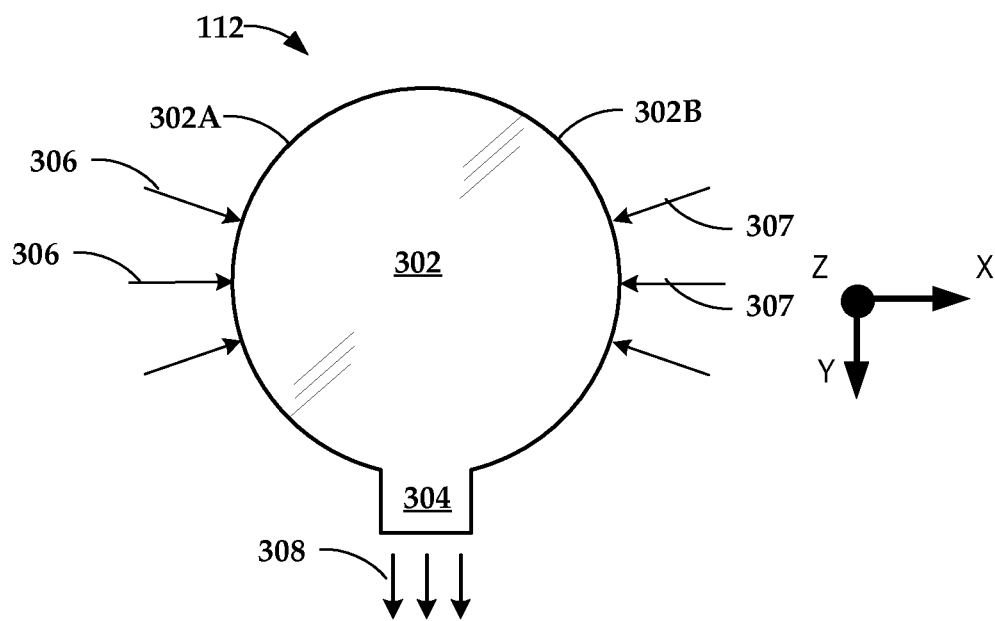
FIG. 3 is a plan view showing a near-field transducer according to an example embodiment.

In reference now to FIG. 3, a plan view shows an NFT 112 according to an example embodiment. The NFT 112 includes a circular disk portion 302 with a peg portion 304 that is disposed proximate the media-facing surface (e.g., surface 202 in FIG. 2). The NFT 112 is formed from a thin film of plasmonic material (e.g., gold, silver, copper) on a substrate parallel plain of the slider proximate the write pole (e.g., write pole 212 in FIG. 2). The light delivery waveguide (e.g., waveguide core 206 in FIG. 2) delivers light 306, 307 to first and second sides 302A-302B of the NFT 112. The light 306, 307 causes plasmon resonance on the surface of the NFT 112, and plasmons 308 generated by this resonance is emitted from the peg 304 towards the data storage media where they are absorbed to create a hotspot.

A transducer such as NFT 112 may utilize a longitudinally polarized focusing field. This can be fulfilled by causing a phase shift between two portions of the light 306, 307 that are incident on the first and second sides 302A-302B of the NFT 112. For example, it may be desirable to have the light 306 on one side 302A be phase shifted (e.g., π-phase shift) relative to light 307 on the other side 302B.

Figure 4:
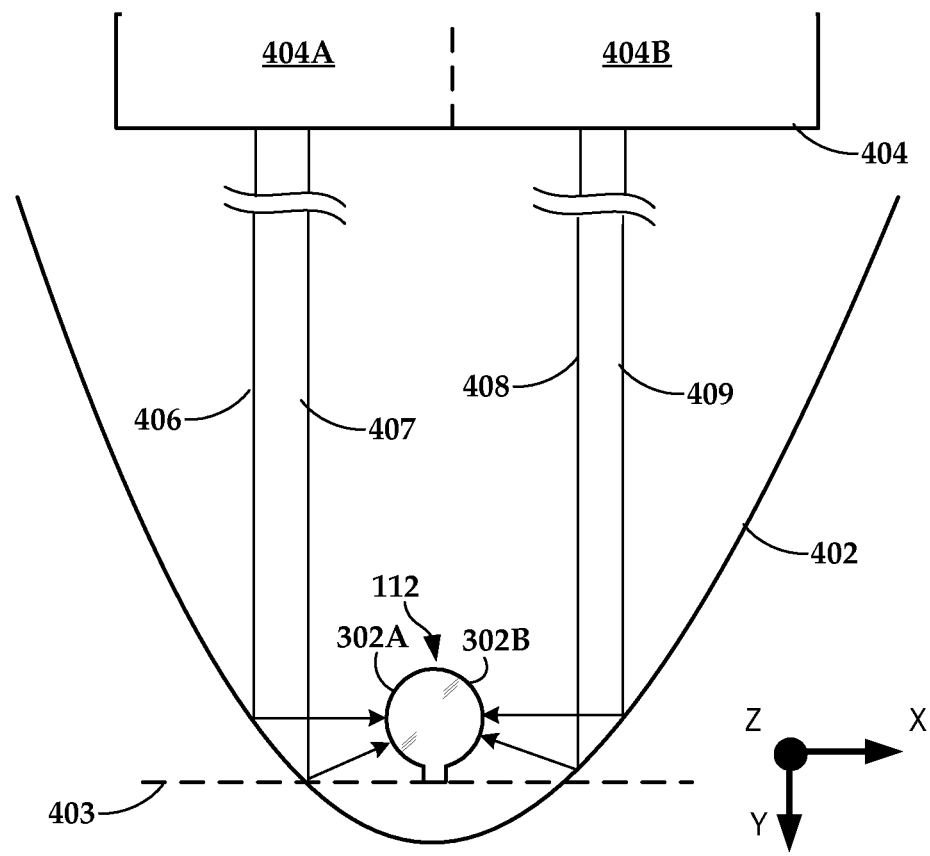
FIG. 4 is a plan view showing a solid immersion mirror used to focus light onto a near-field transducer according to an example embodiment.

In the various embodiments described below, coupling arrangements are described that may be used for delivering phase-shifted light from a waveguide to first and second sides of an NFT. These embodiments may use optical focusing components (e.g., lenses, mirrors) to focus light on the NFT, or the light may be delivered directly from portions of a waveguide to the NFT. An arrangement using a mirror is shown in FIG. 4, which is a plan view showing a solid immersion mirror (SIM) 402 used to focus light onto an NFT 112 according to an example embodiment. In this example, the SIM 402 is parabolic, and the NFT is positioned at the focus of the parabola. The SIM 402 may be formed by creating a parabolic cutout in a substrate, and coating the walls of the cutout with a reflective material. The SIM 402 may be truncated at the ABS, indicated here by dashed line 403.

A waveguide 404 launches light to the sides of the SIM 402, and the rays of light are reflected to the NFT 112 as represented by lines 406-409. The waveguide 404 may launch light 406-409 directly to the walls of the SIM 402, or via intermediate components (e.g., reflectors, collimators, etc.) may be placed between the waveguide 404 and the SIM 402. Generally, the waveguide 404 includes first and second portions 404A, 404B that are different by at least one of a construction or geometry that causes a relative phase shift or mode shift of light that is delivered to sides 302A, 302B of the NFT 112. For example, the first portion 404A may have cladding and/or core materials with an index of refraction different than the second portion 404B.

Although the waveguide 404 is shown with an exit portion located outside of the SIM 402 and NFT 112, the waveguide 404 may extend over or beyond the SIM 402 and/or the NFT 112. For example, the waveguide 404 may be located above or below the SIM 402 and/or NFT along the z-axis and include coupling features to direct light to at least side walls of the SIM 402. In other arrangements, a core or cladding of the waveguide 404 may extend into the SIM 404. For example, the SIM 402 may be filled with a waveguide core/cladding material that encompasses the NFT 112.

Figure 5:
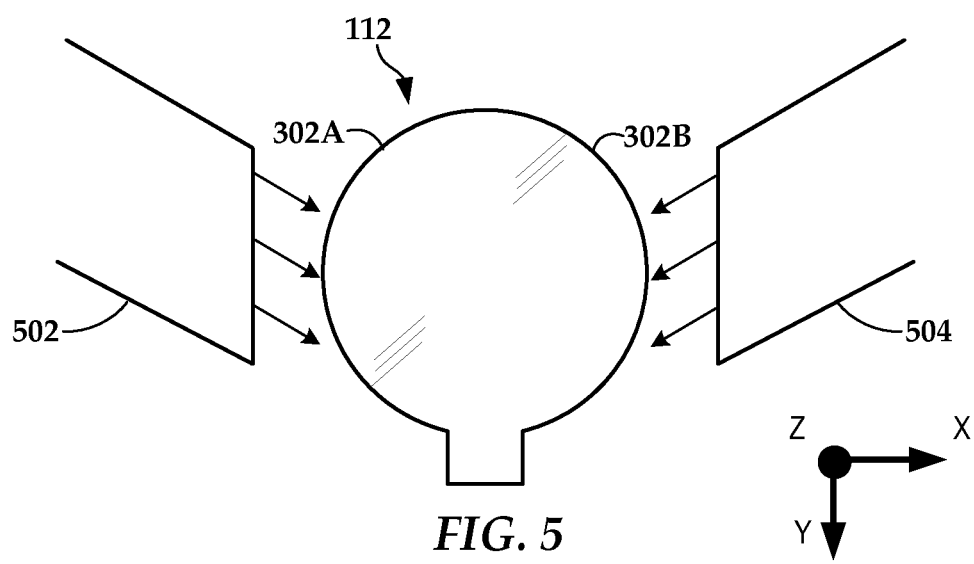
FIG. 5 is a plan view showing first and second portions of a waveguide system that delivers light to sides of a near-field transducer according to an example embodiment.

In FIG. 5, a plan view shows first and second portions 502, 504 of a waveguide system that directly delivers light to sides 302A, 302B of NFT 112 according to an example embodiment. Generally, the portions 502, 504 may be split from a main waveguide portion (not shown) that is coupled to a slider mounted or external light source (e.g., laser). The first and second portions 502, 504 are different by at least one of a construction or geometry that causes a relative phase shift or mode shift of light that is delivered to sides 302A, 302B of the NFT 112.

In reference now to FIG. 6, a schematic diagram illustrates an example of a split waveguide 600 according to an example embodiment. The waveguide 600 may be configured as a channel waveguide that steers a beam from a laser coupler to NFT 112. The waveguide 600 includes an input coupler portion 600C that is coupled to a light source, e.g., coupled to a laser via a grating or other optical coupling component. The waveguide 600 includes first and second portions 600A, 600B that directly output electromagnetic energy (e.g., light) onto respective first and second sides 302A, 302B of NFT 112. A Y-coupler 600D couples the first and second portions 600A, 600B to the input coupler portions 600C.

The waveguide portions 600A, 600B have different lengths between Y-coupler 600D the termination where the waveguide portions 600A, 600B deliver energy to the NFT 112. This difference in path length will induce a relative phase shift between light directed to the different sides 302A, 302B of the NFT 112. In some configurations, it may desirable to induce a phase shift of π, or multiples thereof (nπ). By designing waveguide portions 600A, 600B with geometries having predefined, different path lengths, any desired phase shift can be obtained.

In FIGS. 7 and 8, waveguides 700, 800 are shown according to alternate embodiments. Waveguides 700 and 800 have respective portions 700A, 700B, 800A, 800B mode converter from coupling portions 700C, 800C at Y-couplers 700D, 800D. Portion 700A has a different path length than portion 700B, and portion 800A has a different path length than portion 800B, and so a desired phase shift can be obtained by forming these path length with a predefined path length difference.

In the embodiments shown in FIGS. 6-8, use of a Y-coupler and steering channel waveguide portions can minimize losses that may be induced by other steering and splitting devices, e.g., mirrors, prisms. These channel waveguide embodiments may also be tolerant of processing and wavelength tolerances, as well as operating conditions (e.g., thermal expansion). The illumination angle on the NFT 112 can also be optimized by positioning and angling the termination of the first and second waveguide portions relative to the sides 302A, 302B of the NFT 112. Additional elements such as planar integrated mirrors or waveguide beam expanders can also be included. The shape of the NFT 112 can also be altered to optimize efficiency. For example, the NFT 302 may be asymmetric to account for different illuminations angles of the split waveguide portions.

Figure 9:
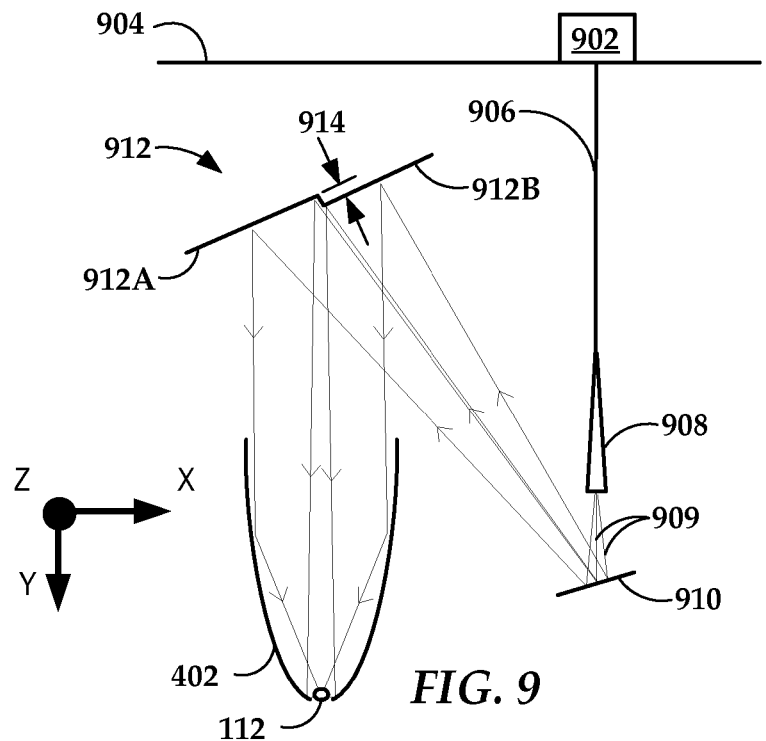
FIG. 9 is a schematic diagram illustrating an arrangement that delivers light to a near-field transducer.

As mentioned above, mirrors and other devices may be used to direct light to an NFT. In reference now to FIG. 9, a schematic diagram illustrates an arrangement that may be used to deliver light to the previously described NFT 112. In this arrangement, light is provided by a laser 902 mounted on a top surface 904 of a slider (e.g., slider 100 in FIG. 1). This arrangement may also be used with free space light delivery, e.g., with a grating on the top surface 904, onto which light is projected from an external laser.

The laser 902 directs light into an input coupler 906 which directs the light to a beam expander 908. Light rays (e.g., represented by paths 909) exit the beam expander and are reflected off of first and second mirrors 910, 912, where they are directed to SIM 402, the features of which are discussed above in relation to FIG. 4. The second mirror 912 may be configured as a collimator, and has two portions 912A, 912B that are offset by a split distance 914. This split 914 can introduce the desired phase shift between beams directed to left or right sides of the SIM 402, which is reflected onto first and second sides of the NFT 112.

It should also be noted that being a geometric feature, the split 914 in mirror 912 is light wavelength sensitive. As a result, the amount of phase shifting may be dependent on the actual wavelength of light generated by the laser 902. Another issue is tight control in masking and fabrication of the mirror 912. The size of split 914 is $\lambda/2n_{\it eff}$, where $\lambda$ denotes light wavelength in free space and $n_{\it eff}$ is the effective mode index. One example is $\lambda=830$ nm, $n_{\it eff}=1.7287$, so split dimension 914 is 239 nm. Tolerances in this dimension will have a direct effect on the amount of phase shift imparted by the mirror 912.

Another issue involved in using a split mirror 912 is beam and wave-front distortion if the split is far away from the focusing element and/or if the incident beam size is small due to a compact slider format. An incident beam coupled into the waveguide (e.g., at coupler 906) is usually in the fundamental mode, which has Gaussian electric field profile (e.g., a single peak) in a direction parallel to the waveguide plane. As the beam propagates through the waveguide and into the focusing element, the beam will be distorted, due to diffraction. The wavefront of the beam will have additional phase variation and the beam shape will also split from single peak into two peaks, which are shifted from the beam center to either side of the beam.

Figure 10:
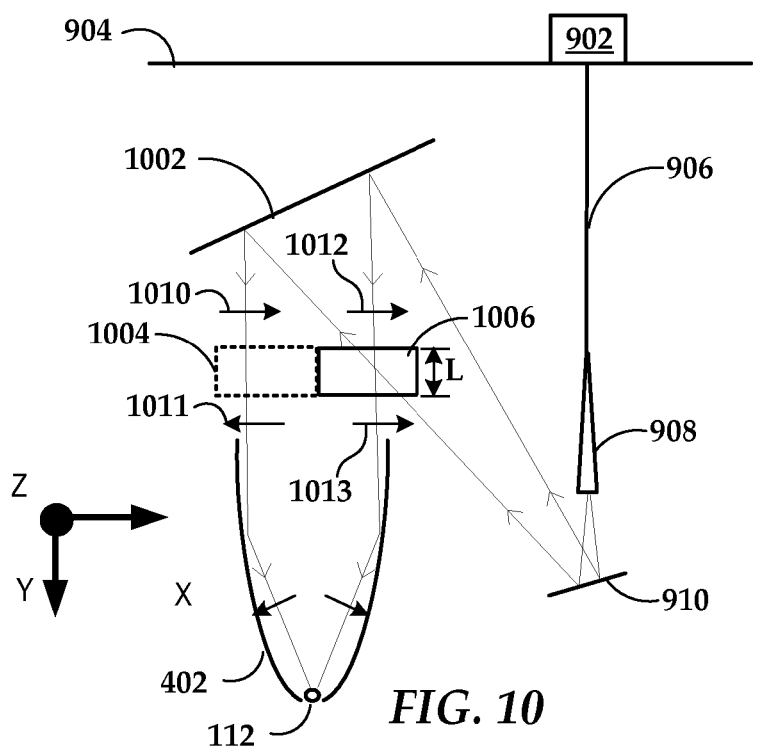
FIG. 10 is a schematic diagram illustrating a differential waveguide used to phase-shift a portion of a light beam according to an example embodiment.

In reference now to FIG. 10, a schematic diagram illustrates differential waveguide used to phase-shift half of a light beam according to an example embodiment. This example uses a continuous mirror 1002 (which may be configured as a collimator). A first portion 1004 of the waveguide between the mirror 1002 and SIM 402 has a slight difference in the waveguide core and/or cladding materials relative to a second 1006 of the waveguide. This induces a phase shift on half of the beam directed to the left part of the SIM 402 relative to the other half directed to the right side of the SIM 402, as indicated by arrows 1010-1013.

The use of the differential waveguide portions 1004, 1006 reduces sensitivity to fabrication tolerances and also reduces diffraction distortion. Light propagates through the different portions 1004, 1006 waveguide at differing phase velocity, thereby accumulating a phase shift (e.g., $\pi$ phase shift). Assuming that the effective mode index is $n_{\it eff1}$ for the left waveguide portion 1004 and $n_{\it eff2}$ for the right waveguide portion 1006, the required length L of the dual waveguide to achieve a particular phase shift depends on the difference between the mode index according to $L=\lambda/(2[n_{\it eff1}-n_{\it eff2}])$, which may be much larger than the split 914 in FIG. 9. Note that the use of dual waveguide portions 1004, 1006 does not increase the sensitivity to light wavelength. In addition, the dual waveguide portions 1004, 1006 may be placed near to the focusing element 402, which minimizes the diffraction effect.

In one example, it is assumed that the dual waveguide portions 1004, 1006 include the same core, 125 nm thick $Ta_2O_5$, with refractive index n=2.08 and the same bottom cladding layer, $Al_2O_3$, n=1.65. The top cladding layer on the left waveguide portion 1004 is $Al_2O_3$, but on the right waveguide portion 1006 it is SiONx, n=1.68. At $\lambda=830$ nm, $n_{\it eff1}=1.7287$, $n_{\it eff2}=1.7745$, L=9.057 nm for a $\pi$ phase shift. The 9057 nm dimension is much larger than the 239 nm dimension of the split 914 for the same wavelength. As a result, the differential waveguide is less sensitive to fabrication tolerances.

It will be understood that the first and second waveguide portions 1004, 1006 may cause a relative phase shift between first and second portions of light in any light delivery arrangement. For example, the Y-coupler split waveguides shown in FIGS. 6-8 may also include regions before or after the Y-coupler that include different core and/or cladding materials. This may be used, for example, to fine-tune the phase shifting that occurs in the mode converter portions following the Y-couplers.

An incident beam coupled into the waveguide (e.g., at coupler 906 shown in FIG. 9) is usually in the fundamental mode, which has Gaussian electric field profile (e.g., a single peak) in a direction parallel to the waveguide plane. For some NFTs (e.g., funnel-type near-field transducers, lollipop-type near-field transducer shown in FIG. 3), it is desirable to illuminate the NFT with light in a first higher mode, e.g., transverse electric ($TE_{10}$) mode, for light delivery and NFT excitation efficiency. mode conversion from the fundamental mode ($TE_{00}$) to the first higher mode is therefore preferred. The $TE_{10}$ mode is an eigen-mode of the planar waveguide. The beam wavefront does not change with propagation, even though the beam size (in-plane) will change.

Figure 11:
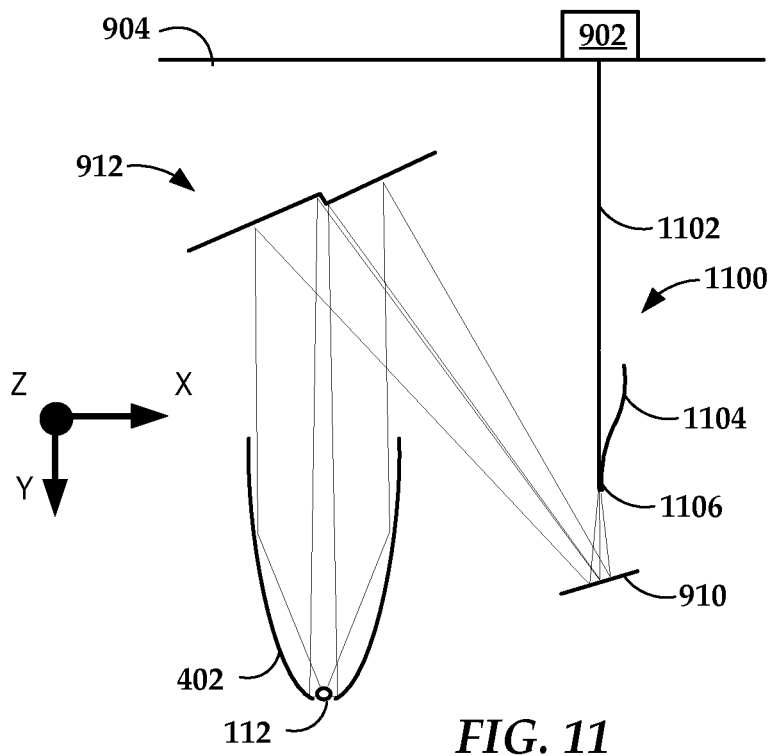
FIG. 11 is a schematic diagram illustrates a mode converter waveguide that converts fundamental waveguide modes according to an example embodiment.
Figure 12:
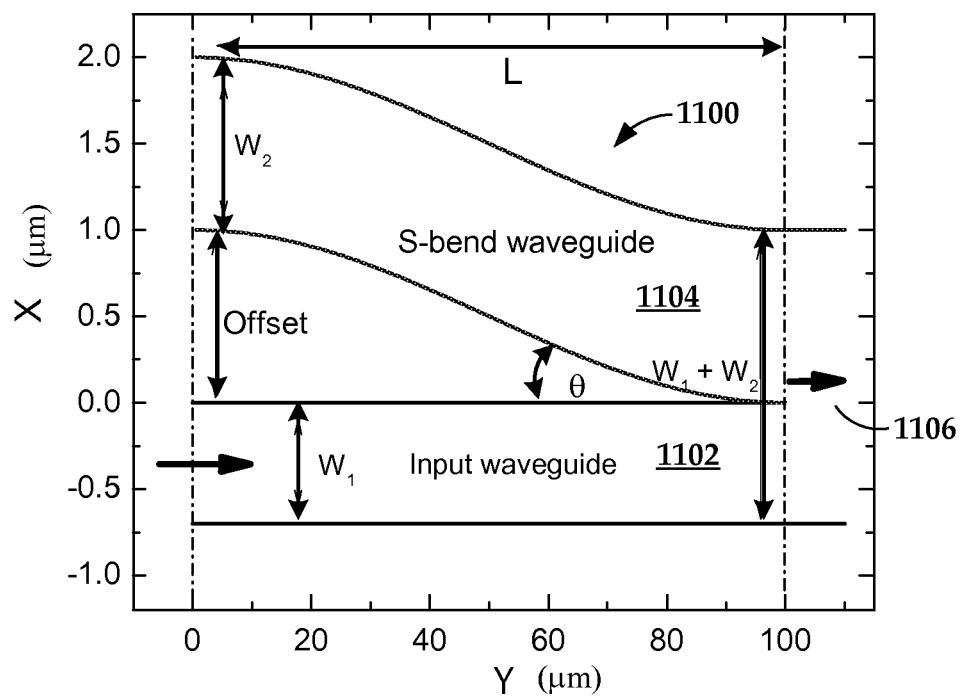
FIG. 12 is graph illustrating dimensions of an example of the mode converter waveguide shown in FIG. 11.

In reference now to FIG. 11, a schematic diagram illustrates a mode converter waveguide 1100 that converts fundamental waveguide modes according to an example embodiment. The mode converter waveguide 1100 includes two three-dimensional channel waveguides: an input waveguide coupler 1102 and an S-bend waveguide 1104 that branches from the input waveguide coupler 1102. A portion of the waveguide 1106 extends beyond the junction of the input coupler 1102 and branching S-bend 1106, and is referred to herein as the combined waveguide 1106. Dimensions of an example embodiment of the mode converter waveguide are shown in the graph of FIG. 12.

The mode converter waveguide 1100 converts the fundamental mode ($TE_{00}$ or $TM_{00}$) in the input coupler into the first high-order mode ($TE_{10}$ or $TM_{10}$ in the combined waveguide 1106. The $TE_{10}$ and $TM_{10}$ modes are eigenmodes of the waveguide 1100 and will propagate in the waveguide without distortion. These modes have two side-lobes in intensity profile having a π phase difference. As seen in FIG. 12, the channel width W2 of the S-bend waveguide 1104 is larger than the width W1 of the input coupler 1102, and both channel waveguides are single mode. The combined waveguide 1106 supports the first higher-order mode.

As the two waveguides 1102, 1104 are slowly brought together, light propagating in the input waveguide coupler 1102 interacts with the S-bend waveguide 1104 evanescently, and the fundamental mode in the input coupler 1102 is converted into the first high-order mode of the combined waveguide 1106. This conversion is tolerant to variations in polarization and light wavelength, although in some configurations the mode converter angle θ of the two waveguides may need to be carefully controlled. Assuming the mode converter angle is small, the conversion will be fulfilled.

As an example, assuming that the three-dimensional input waveguide 1102 is made of a $Ta_2O_5$ core of refractive index n=2.08 and $Al_2O_3$ cladding, n=1.65. It is 0.7 μm wide (along the x-direction, see $W_1$ in FIG. 12) and 0.15 μm thick along the z-direction (out of the plane of the page). The S-bend waveguide 1104 has a cosine shape. The lower boundary of the S-bend waveguide can be expressed as: x(y)=0.5*Offset [1+cos(πy/L)]. The definition of offset and L is seen in FIG. 12. The variable $W_2$ denotes the S-bend core width. For this example, L=100 μm, offset=1 μm, $W_2$=1 μm.

Figure 13:
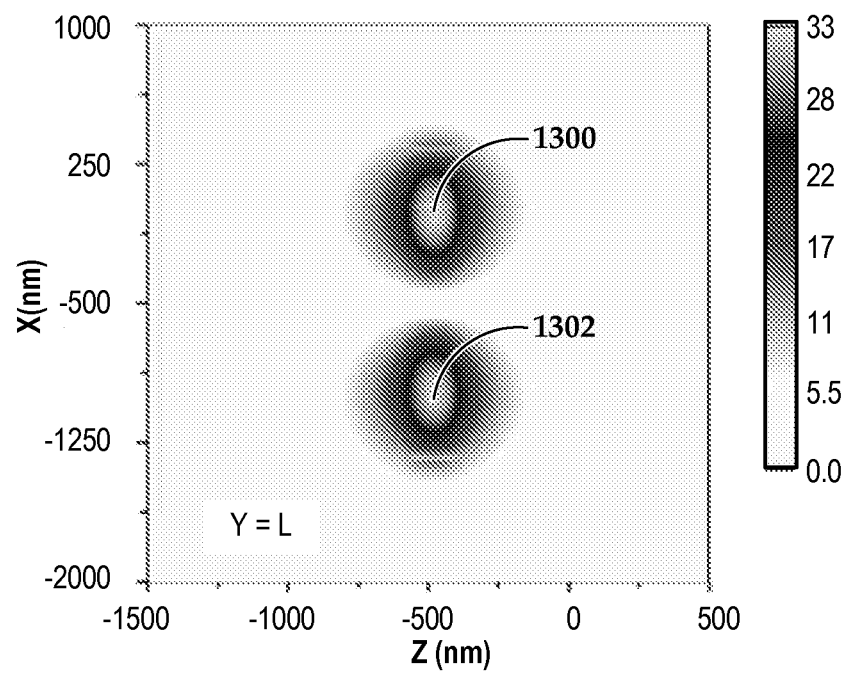
FIGS. 13-17 are graphs illustrating simulated respective field and phase profiles of a mode converter waveguide arrangements according to example embodiments.
Figure 14:
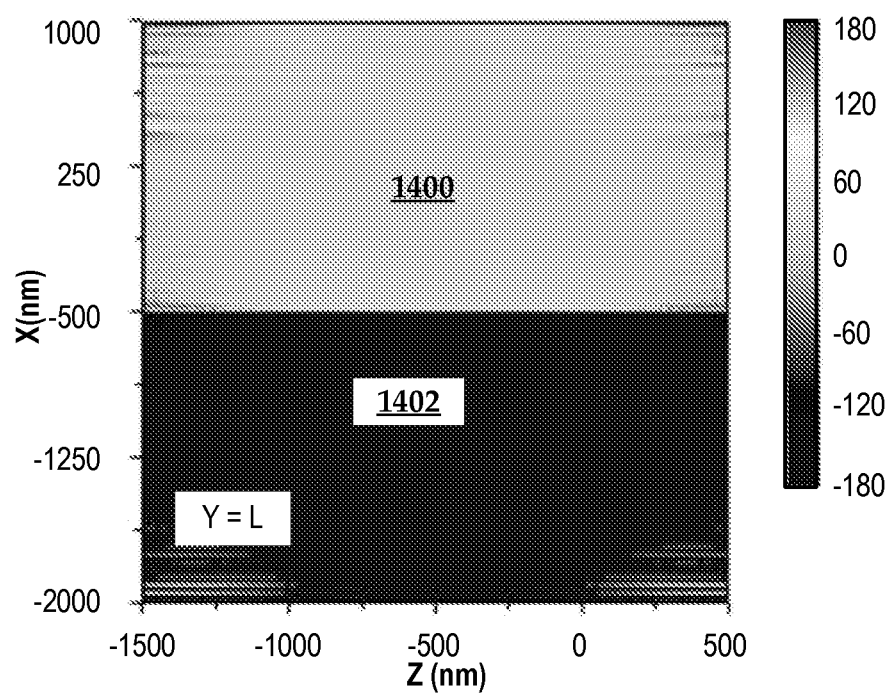
Figure 15:
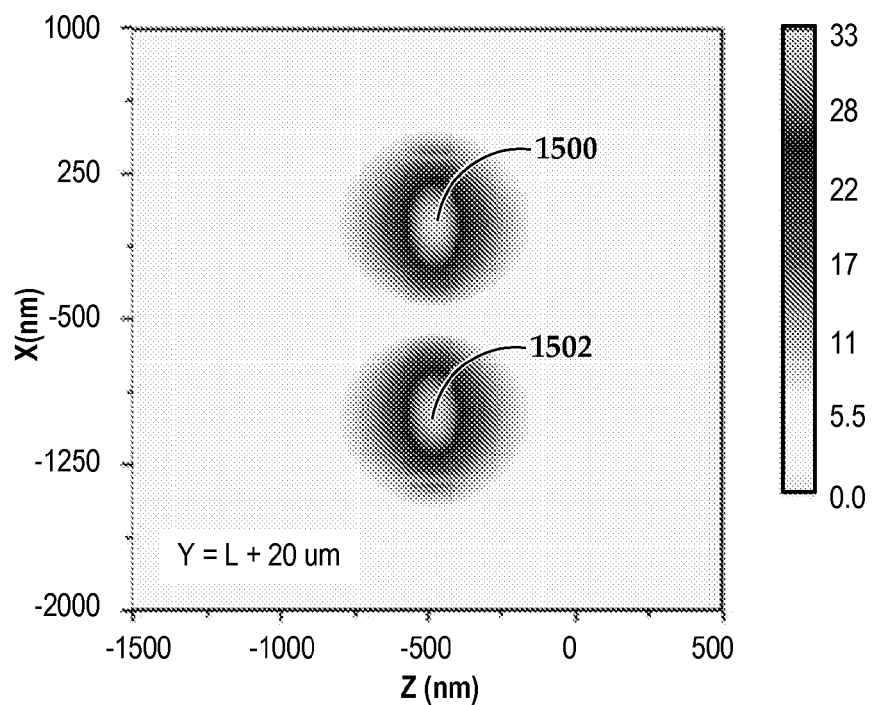

An analysis was performed assuming light (wavelength λ=0.83 μm) is coupled into the input waveguide from an edge-emitting laser diode in $TE_{00}$ mode. Both waveguides only permit the fundamental mode. In FIG. 13, a graph shows the profiles of electric field at the joint of two waveguides, y=L. The peak field is seen in regions 1300, 1302 of FIG. 13. The graph in FIG. 14 shows phase of electric field at y=L. Region 1400 in FIG. 14 is about 0 degrees, and region 1402 is about −180 degrees. The graph in FIG. 15 shows the electric field after 20 μm propagation through the combining waveguide (y=L+20 μm). Maximum field in FIG. 15 is seen in regions 1500 and 1502.

Figure 16:
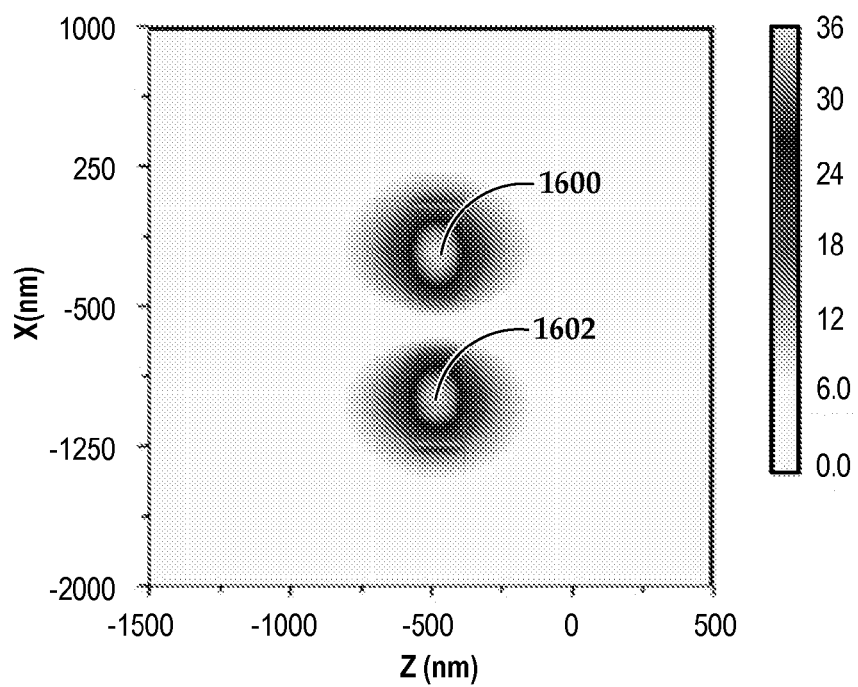
Figure 17:
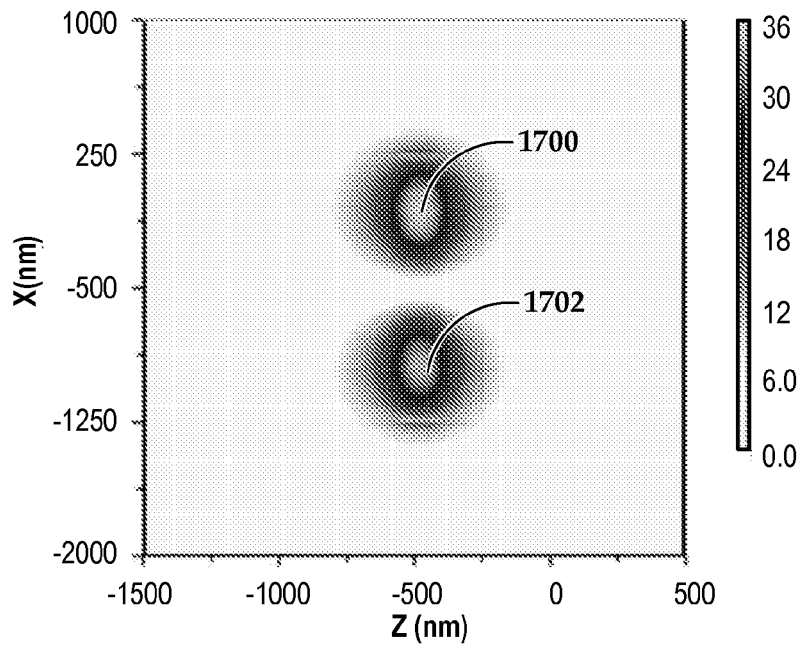

It can be seen in FIGS. 13 and 15 that the amplitude profile has two maxima and FIG. 14 shows the phase shifts between two spots, which is the signature of $TE_{10}$ mode. After 20 μm propagation in the combining waveguide, there is little change in the mode profile. Note that it is not necessary to have the full S-bend to achieve mode conversion. The two waveguides do not interact until z=60 μm. This means that about half of the S-bend wavelength may be used for acceptable results. The graphs in FIGS. 16 and 17 show mode conversion is still fulfilled with variances in waveguide width and offset. Maximum field in FIG. 16 is at regions 1600 and 1602, and maximum field in FIG. 17 is at regions 1700 and 1702. The results in FIG. 16 are for $W_1$=0.5 μm, $W_2$=0.8 μm, offset=1.2 μm. The results in FIG. 17 are for $W_1$=0.5 μm, $W_2$=1.0 μm, offset=1.2 μm.

It will be understood that the mode converter waveguide shown in FIGS. 11 and 12 can be used with any optical energy coupling arrangement known in the art. For example, the mode converter waveguide 1100 may be used with a split mirror 912 as shown in FIG. 11, or with an un-split mirror 1002 as shown in FIG. 10. The mode converter waveguide 1100 may also be used with Y-coupled waveguides as shown in FIGS. 6-8. Additional embodiments of a mode converter waveguide are shown in FIGS. 19 and 20.

Figure 19:
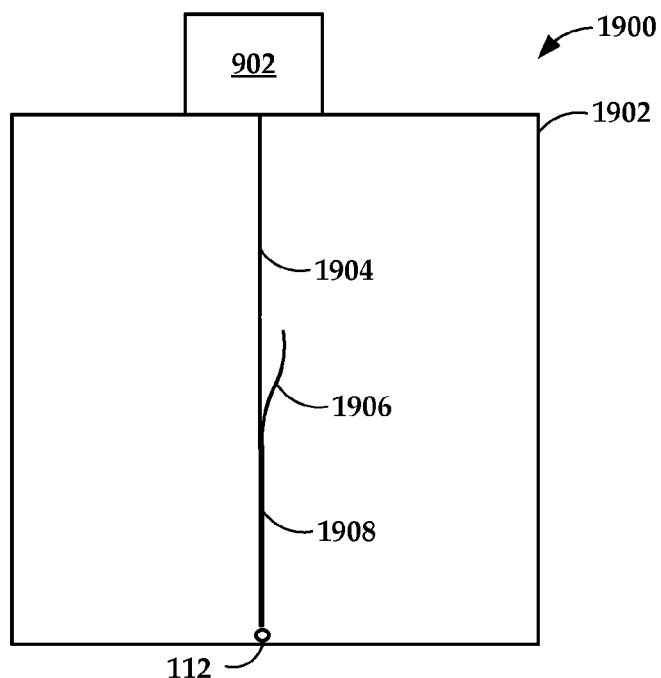
FIGS. 19 and 20 are schematic diagrams illustrating mode converter waveguide arrangements according to additional embodiments.

In FIG. 19, a schematic diagram illustrates a slider assembly with a laser 902 and NFT 112 that may both be similar to analogous components described elsewhere herein. The laser 902 is mounted on slider body 1902 wherein it is coupled to a waveguide input coupler 1904. A mode converter waveguide 1906 is coupled to the input coupler 1904 and delivery waveguide 1908, the delivery waveguide 1908 delivering light to the NFT 112 directly (e.g., without focusing mirrors or other intermediary optical devices). In this example, the mode converter waveguide 1906, e.g., branching S-bend/cosine curve waveguide, is configured as a mode converter, e.g., $TE_{00}$ to $TE_{10}$.

Figure 20:
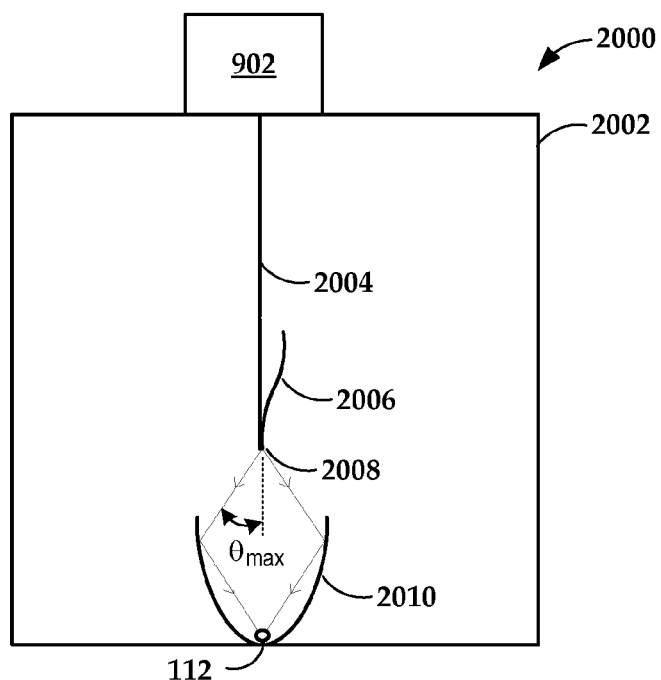

In FIG. 20, a schematic diagram illustrates a slider assembly with a laser 902 and NFT 112 that may both be similar to analogous components described elsewhere herein. The laser 902 is mounted on slider body 2002 wherein it is coupled to a waveguide input coupler 2004. A mode converter waveguide 2006 is coupled to the input coupler 2004 at a delivery region 2008, where light is launched to a SIM 2010 which focuses light onto the NFT 112. The delivery region 2008 may include a beam expander (not shown) which expands light by half-angle $\theta_{max}$. In this example, the mode converter waveguide 2006 e.g., S-bend/cosine curve waveguide, is configured as a mode converter, e.g., $TE_{00}$ to $TE_{10}$.

Figure 18:
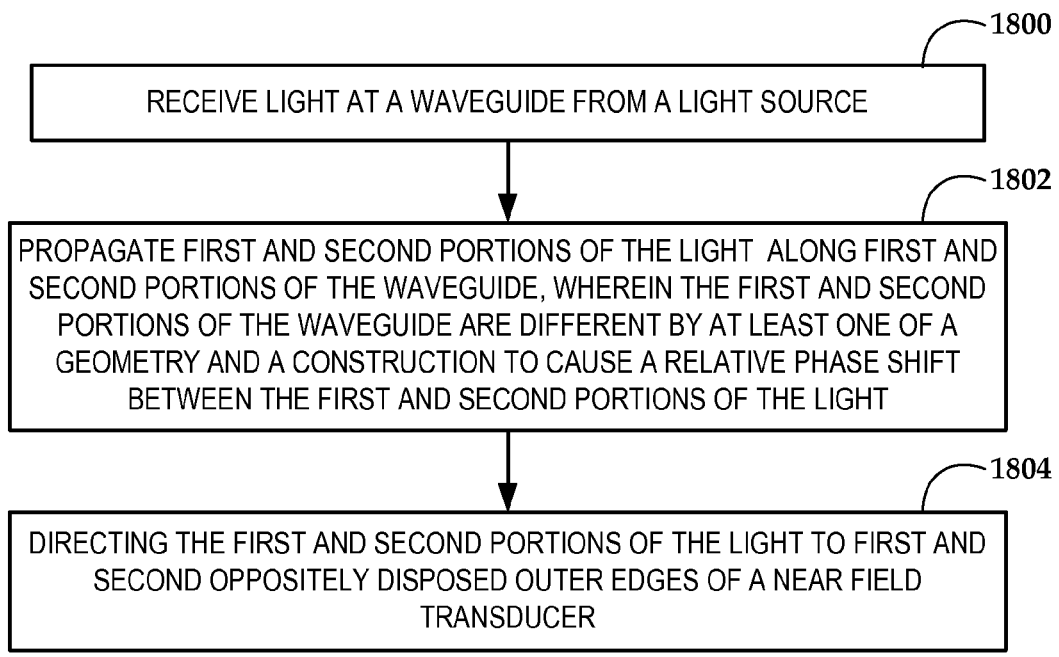
FIG. 18 is a flowchart of a method according to an example embodiment.

In reference now to FIG. 18, a flowchart illustrates a method according to an example embodiment. The method involves receiving 1800 light at a waveguide from a light source. First and second portions of the light are caused to propagate 1802 along first and second portions of the waveguide, wherein the first and second portions of the waveguide are different by at least one of a geometry and a construction to cause a relative phase shift between the first and second portions of the light. The first and second portions of the light are directed 1804 to first and second oppositely disposed outer edges of a near field transducer.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
    a plasmonic transducer comprising first and second oppositely disposed outer edges; and
    a waveguide configured to receive light from a light source, the waveguide comprising first and second portions that deliver first and second portions of the light to the first and second edges of the plasmonic transducer, wherein the first and second portions are different by at least one of a geometry and a construction to cause a relative phase shift between the first and second portions of the light.

2. The apparatus of claim 1, wherein the first and second portions are different by a path length from a splitter to the respective first and second edges of the plasmonic transducer.

3. The apparatus of claim 1, wherein the first and second portions have respective core materials with different indices of refraction.

4. The apparatus of claim 1, wherein the first and second portions have respective cladding materials with different indices of refraction.

5. The apparatus of claim 1, further comprising a mode converter waveguide coupled to the waveguide between the light source and first and second portions, wherein the mode converter waveguide converts the light traversing the waveguide to a higher order mode.

6. The apparatus of claim 5, wherein the mode converter waveguide comprises a branching S-bend.

7. The apparatus of claim 1, wherein the plasmonic transducer comprises a disk coupled towards a peg that is disposed towards a media writing surface, the first and second oppositely disposed outer edges being located at least on the disk.

8. The apparatus of claim 1, wherein the relative phase shift between the first and second portions of the light causes a longitudinally polarized focusing field to be incident on the plasmonic transducer.

9. A method comprising:
receiving light at a waveguide from a light source;
propagating first and second portions of the light along first and second portions of the waveguide, wherein the first and second portions of the waveguide are different by at least one of a geometry and a construction to cause a relative phase shift between the first and second portions of the light; and
directing the first and second portions of the light to first and second oppositely disposed outer edges of a near field transducer.

10. The method of claim 9, wherein the first and second portions of the waveguide comprise different path lengths from a splitter to the respective first and second edges of the near field transducer.

11. The method of claim 9, wherein the first and second portions of the waveguide have respective core materials with different indices of refraction.

12. The method of claim 9, wherein the first and second portions of the waveguide have respective cladding materials with different indices of refraction.

13. The method of claim 9, wherein the waveguide comprises a mode converter waveguide coupled between the light source and first and second portions of the waveguide, wherein the mode converter waveguide converts the light traversing the waveguide to a higher order mode.

14. The method of claim 13, wherein the mode converter waveguide comprises a branching cosine shape.

15. The method of claim 9, wherein the near-field transducer comprises a disk coupled towards a peg that is disposed towards a media writing surface, the first and second oppositely disposed outer edges being located at least on the disk.

16. The method of claim 9, wherein the relative phase shift between the first and second portions of the light causes a longitudinally polarized focusing field to be incident on the near field transducer.

17. An apparatus comprising:
a plasmonic transducer comprising first and second oppositely disposed outer edges;
a waveguide configured to receive light from a light source, the waveguide comprising first and second portions that deliver first and second portions of the light to the first and second edges of the plasmonic transducer, wherein the first and second portions are different by at least one of a geometry and a construction to cause a relative phase shift between the first and second portions of the light; and
a mode converter waveguide coupled between the light source and first and second portions of the waveguide, wherein the mode converter waveguide converts the light traversing the waveguide to a higher order mode.

18. The apparatus of claim 17, wherein the first and second portions are different by a path length from a splitter to the respective first and second edges of the plasmonic transducer.

19. The apparatus of claim 17, wherein the first and second portions have respective core materials with different indices of refraction.

20. The apparatus of claim 17, wherein the first and second portions have respective cladding materials with different indices of refraction.

* * * * *